US007607091B2

(12) United States Patent
Song (10) Patent No.: US 7,607,091 B2
(45) Date of Patent: Oct. 20, 2009

(54) METHOD AND APPARATUS FOR DISPLAYING POSITIONS OF HOME NETWORK APPLIANCES

(75) Inventor: Young-Hun Song, Seoul (KR)

(73) Assignee: LG Electronics Inc., Seoul (KR)

( * ) Notice: Subject to any disclaimer, the term of this patent is extended or adjusted under 35 U.S.C. 154(b) by 460 days.

(21) Appl. No.: 10/657,136

(22) Filed: Sep. 9, 2003

(65) Prior Publication Data

US 2004/0063405 A1 Apr. 1, 2004

(30) Foreign Application Priority Data

Oct. 1, 2002 (KR) ...................... 10-2002-0059956

(51) Int. Cl.
*G06F 15/177* (2006.01)
*G06F 15/16* (2006.01)

(52) U.S. Cl. ....................... 715/734; 715/735; 715/736; 715/738; 709/201; 709/223; 709/224

(58) Field of Classification Search ................. 715/734, 715/735, 736, 737, 738; 709/201, 223, 224
See application file for complete search history.

(56) References Cited

U.S. PATENT DOCUMENTS

| 6,005,861 | A | * | 12/1999 | Humpleman ................. 370/352 |
| 6,020,881 | A | * | 2/2000 | Naughton et al. ............. 715/740 |
| 6,198,479 | B1 | * | 3/2001 | Humpleman et al. ......... 715/733 |
| 6,363,434 | B1 | * | 3/2002 | Eytchison ................... 719/313 |
| 6,426,761 | B1 | * | 7/2002 | Kanevsky et al. ............ 715/788 |
| 6,466,971 | B1 | * | 10/2002 | Humpleman et al. ......... 709/220 |
| 6,496,182 | B1 | * | 12/2002 | Wong et al. .................. 345/173 |
| 6,546,419 | B1 | * | 4/2003 | Humpleman et al. ......... 709/223 |
| 6,563,430 | B1 | * | 5/2003 | Kemink et al. .......... 340/825.49 |
| 6,735,619 | B1 | * | 5/2004 | Sawada ....................... 709/212 |
| 6,759,946 | B2 | * | 7/2004 | Sahinoglu et al. ...... 340/310.11 |
| 6,792,323 | B2 | * | 9/2004 | Krzyzanowski et al. ........ 700/90 |
| 6,801,507 | B1 | * | 10/2004 | Humpleman et al. ......... 370/257 |
| 6,850,149 | B2 | * | 2/2005 | Park ............................ 340/7.1 |
| 6,885,362 | B2 | * | 4/2005 | Suomela ..................... 345/156 |
| 7,039,858 | B2 | * | 5/2006 | Humpleman et al. ...... 715/501.1 |
| 7,043,532 | B1 | * | 5/2006 | Humpleman et al. ......... 709/208 |
| 7,103,834 | B1 | * | 9/2006 | Humpleman et al. ...... 715/501.1 |
| 7,117,239 | B1 | * | 10/2006 | Hansen ....................... 709/200 |
| 7,136,914 | B2 | * | 11/2006 | Motoyama .................. 709/223 |
| 7,200,683 | B1 | * | 4/2007 | Wang et al. ................. 709/250 |
| 7,231,592 | B2 | * | 6/2007 | Humpleman et al. ...... 715/500.1 |
| 2001/0034754 | A1 | * | 10/2001 | Elwahab et al. ............. 709/201 |
| 2002/0091812 | A1 | * | 7/2002 | Ando et al. ................. 709/223 |

(Continued)

FOREIGN PATENT DOCUMENTS

KR 1999-0086325 A 12/1999

(Continued)

*Primary Examiner*—Steven B Theriault
(74) *Attorney, Agent, or Firm*—Birch, Stewart, Kolasch & Birch, LLP (57) ABSTRACT

In a method and an apparatus for displaying positions of home network appliances capable of making a user easily recognize positions of home network appliances to control, the method includes generating an appliance identifier for indicating a type of each home network appliance connected to a home network; setting a position pointer for indicating a position of each home network appliance; and displaying the appliance identifier and the position pointer on a screen as graphic objects.

7 Claims, 5 Drawing Sheets

U.S. PATENT DOCUMENTS

| | | | |
|---|---|---|---|
| 2003/0001883 A1* | 1/2003 | Wang ........................ 345/736 |
| 2003/0009537 A1* | 1/2003 | Wang ........................ 709/219 |
| 2003/0046557 A1* | 3/2003 | Miller et al. ................ 713/186 |
| 2003/0103088 A1* | 6/2003 | Dresti et al. ................ 345/835 |
| 2003/0107476 A1* | 6/2003 | Sahinoglu et al. ...... 340/310.01 |
| 2004/0163073 A1* | 8/2004 | Krzyzanowski et al. ..... 717/107 |
| 2006/0019679 A1* | 1/2006 | Rappaport et al. ....... 455/456.5 |

FOREIGN PATENT DOCUMENTS

| KR | 2001-0085906 A | 9/2001 |
|---|---|---|
| KR | 2002-0011029 A | 2/2002 |

* cited by examiner

| POSITION POINTER(#) | | | | | | | |
|---|---|---|---|---|---|---|---|
| BOUDOIR(#1) | | LIVING ROOM(#2) | | BEDROOM(#3) | | KITCHEN(#4) | |
| F·N1 | UDN1 | F·N1 | UDN3 | F·N1 | UDN7 | F·N2 | UDN8 |
| F·N2 | UDN2 | F·N3 | UDN4 | | | F·N6 | UDN9 |
| | | F·N4 | UDN5 | | | | |
| | | F·N5 | UDN6 | | | | |

F·N(Friendly Name): APPLIANCE TYPE IDENTIFIER
UDN(Universal Domain Number): PRODUCT INHERENT IDENTIFIER
: POSITION POINTER
1~9: PERTINENT N BIT CODE OF AN IDENTIFIER

METHOD AND APPARATUS FOR DISPLAYING POSITIONS OF HOME NETWORK APPLIANCES

This nonprovisional application claims priority under 35 U.S.C. §119(a) on Patent Application No. 2002-0059956 filed in KOREA on Oct. 1, 2002, which is herein incorporated by reference.

BACKGROUND OF THE INVENTION

1. Field of the Invention

The present invention relates to a home network, and in particular to an apparatus and a method for displaying a position of an apparatus connected to a home network.

2. Description of the Prior Art

Recently, according to development of information technology, various home network appliances such as a mobile phone, a digital television, an air conditioner, a refrigerator, a PDA (personal digital assistants), a video game device, etc. besides a PC (personal computer) have been connected to a home network, and accordingly a home network technology has been developed.

The home network technology is for connecting home network appliances connected to a home network inside home with one topology, making the home network appliances own digital data thereof commonly and making them perform broadband communication. In a narrow sense, the home network technology means wire and wireless network apparatus themselves, in a broad sense, the home network technology includes not only the apparatus but also a middleware for integrating/controlling/operating home network appliances mutually or a service, etc. Hereinafter, a construction of the home network will be described with reference to accompanying FIG. 1.

Figure 1:
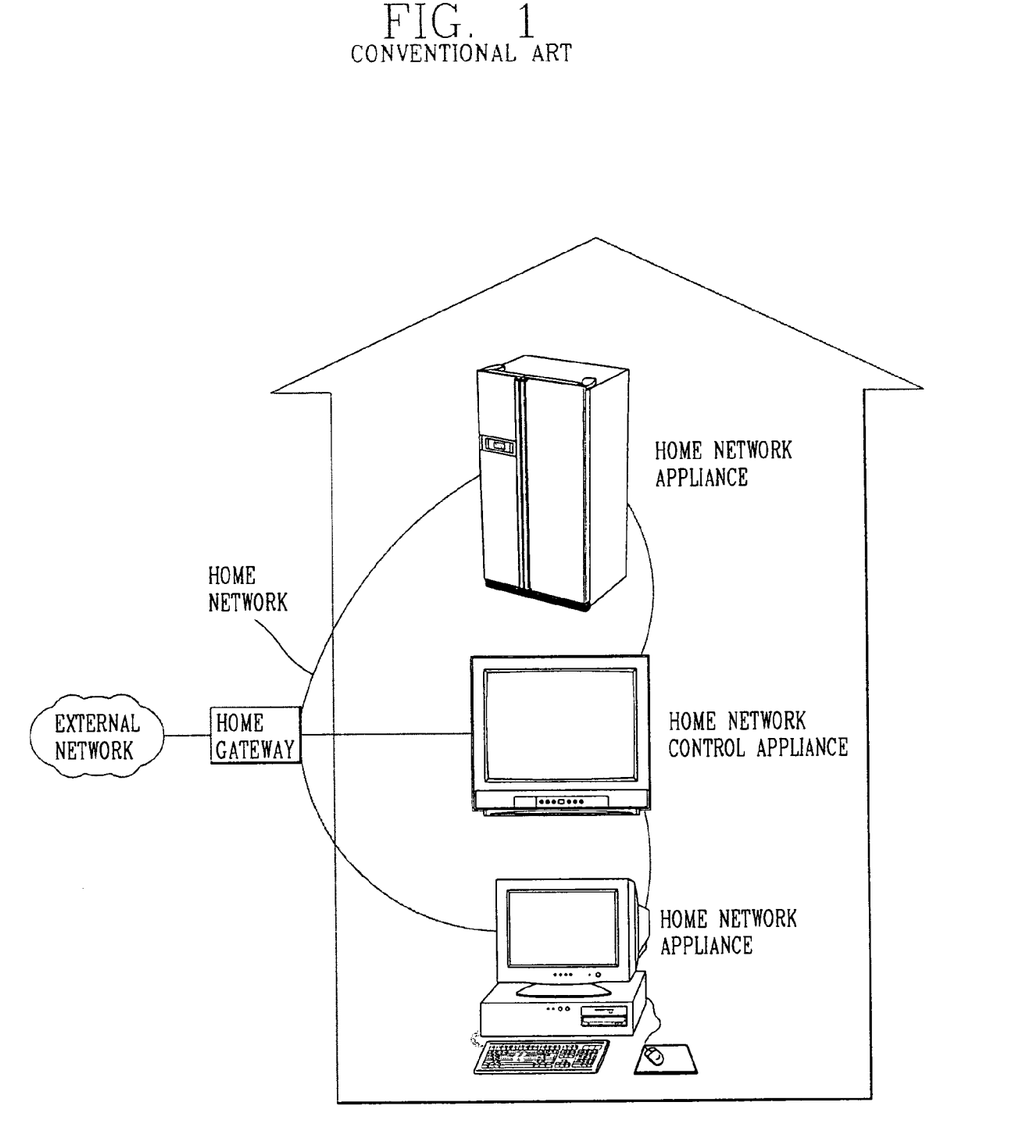
FIG. 1 is a block diagram illustrating a construction of a general home network.

FIG. 1 is a block diagram illustrating a construction of a general home network.

As depicted in FIG. 1, the general home network includes home network appliances; and a home network control appliance for controlling the home network appliances, herein, the home network appliances and the control apparatus are connected by one topology. The home network appliance is connected to an ISP (Internet service provider) through a gateway so as to receive several Internet services.

Operation processes of the home network appliances in the home network will be described with reference to accompanying FIG. 2A.

Figure 2A:
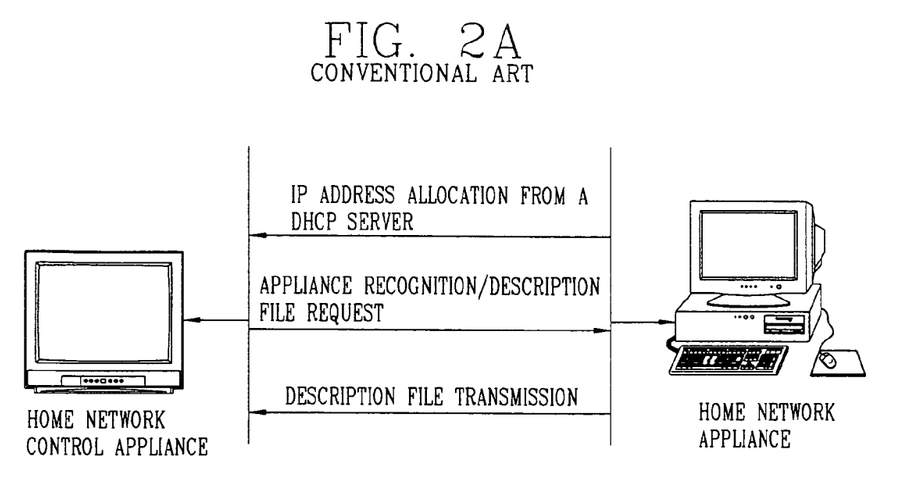
FIG. 2A illustrates operation processes between the home network appliances in the general home network.

FIG. 2A illustrates operation processes between the home network appliances in the general home network.

First, a DHCP (dynamic host configuration protocol) server allocates an IP (Internet protocol) address to each home network appliance and the control apparatus.

Each home network appliance multicasts UUID (universally unique identifier) data and an URL (uniform resource locator) for indicating a data position at which apparatus information thereof is stored to the control apparatus by using the allocated IP address thereof. Herein, the control apparatus recognizes each home network appliance and requests data indicated by the URL.

According to the request of the control apparatus, the home network appliance transmits a description file having detailed various apparatus information and service information to the control apparatus.

The control apparatus controls and operates the home network appliance connected thereto through the transmitted description file. Herein, the description file is basically provided as a XML (extensible markup language) spec.

Figure 2B:
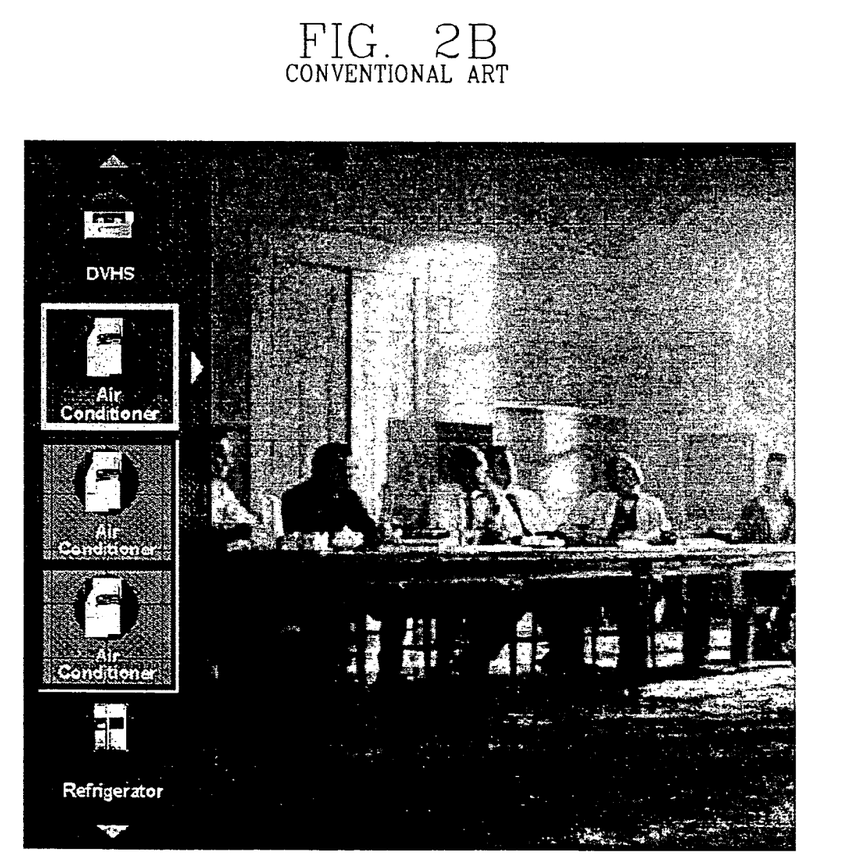
FIG. 2B shows a screen of a home network control appliance displaying pertinent graphic objects of the home network appliances.

FIG. 2B shows a screen of a home network control appliance displaying pertinent graphic objects of the home network appliances. Herein, the home network control appliance means a DTV (digital television) controllable the home network. In more detail, the DTV displays icons corresponded to the home network appliances connected to the home network on the screen.

However, as depicted in FIG. 2B, because the same type of the home network appliances (air conditioner) are displayed as the same icons, it might be difficult for a user to distinguish which icon is corresponded to the home network appliance to be controlled. In more detail, when icons corresponded to plural air conditioners as the home network appliances are displayed on the screen of the DTV as the home network control appliance, because the plural air conditioners are displayed as the same icons, it might be difficult for the user to distinguish which icon (graphic object) is corresponded to the air conditioner to be controlled.

SUMMARY OF THE INVENTION

In order to solve the above-mentioned problem, it is an object of the present invention to provide an apparatus capable of distinguishing positions of different types of home network appliances connected to a home network control appliance.

It is another object of the present invention to provide an apparatus capable of distinguishing positions of the same type of home network appliances connected to a home network control appliance.

It is yet another object of the present invention to provide an apparatus capable of displaying respectively distinguished positions of home network appliances on a screen as graphic objects in order to make a user easily recognize positions of the home network appliances.

It is still yet another object of the present invention to provide an apparatus for displaying positions of home network appliances capable of distinguishing home network appliances by positions, combining a text object for indicating a position of each home network appliance with a graphic object of a pertinent home network appliance and displaying the combined object on a screen in order to make a user easily recognize a position of a home network appliance to be controlled.

In order to achieve the above-mentioned object, a method for displaying positions of home network appliances in accordance with the present invention includes generating an appliance identifier for indicating a type of each home network appliance connected to a home network; setting a position pointer for indicating a position of each home network appliance; and displaying the appliance identifier and the position pointer on a screen as graphic objects.

In order to achieve the above-mentioned object, an apparatus for displaying positions of home network appliances in accordance with the present invention includes a means for generating an appliance identifier for indicating a type of a home network appliance connected to a home network; a means for setting a position indicator for indicating a position of the home network appliance; and a means for displaying the appliance identifier and the position indicator on a screen as graphic objects.

In order to achieve the above-mentioned object, an apparatus for displaying positions of home network appliances in accordance with the present invention includes an appliance identifier generating unit for generating an appliance identifier by reading an appliance type identifier and an appliance inherent identifier from appliance characteristics data stream transmitted from a home network appliance and linking the appliance type identifier to the appliance inherent identifier; a position matching unit for setting a position pointer for indicating a position of the home network appliance and matching the set position pointer with the appliance identifier of the home network appliance corresponded to the position pointer; and a display unit for generating a text object for indicating the position pointer matched to the appliance identifier, generating a graphic object for indicating the appliance identifier matched to the position indicator, generating a position indication object by combining the text object with the graphic object and displaying the position indication object on a screen.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the preferred embodiments of a method and an apparatus for displaying positions of home network appliances by distinguishing home network appliances according to positions, combining text objects indicating pertinent positions of the home network appliances with graphic objects indicating the distinguished home network appliances and displaying the combined objects on a screen order to make a user recognize a position of the home network appliance to be controlled easily in order to make a user recognize a position of the home network appliance to be controlled easily will be described in detail with reference to accompanying FIGS. 3~7. Herein, the home network appliance means a computer, a refrigerator, an air conditioner, a washing machine, a digital television and a VTR, etc. and the home network appliances are controlled by a control apparatus (for example, a digital television).

Figure 3:
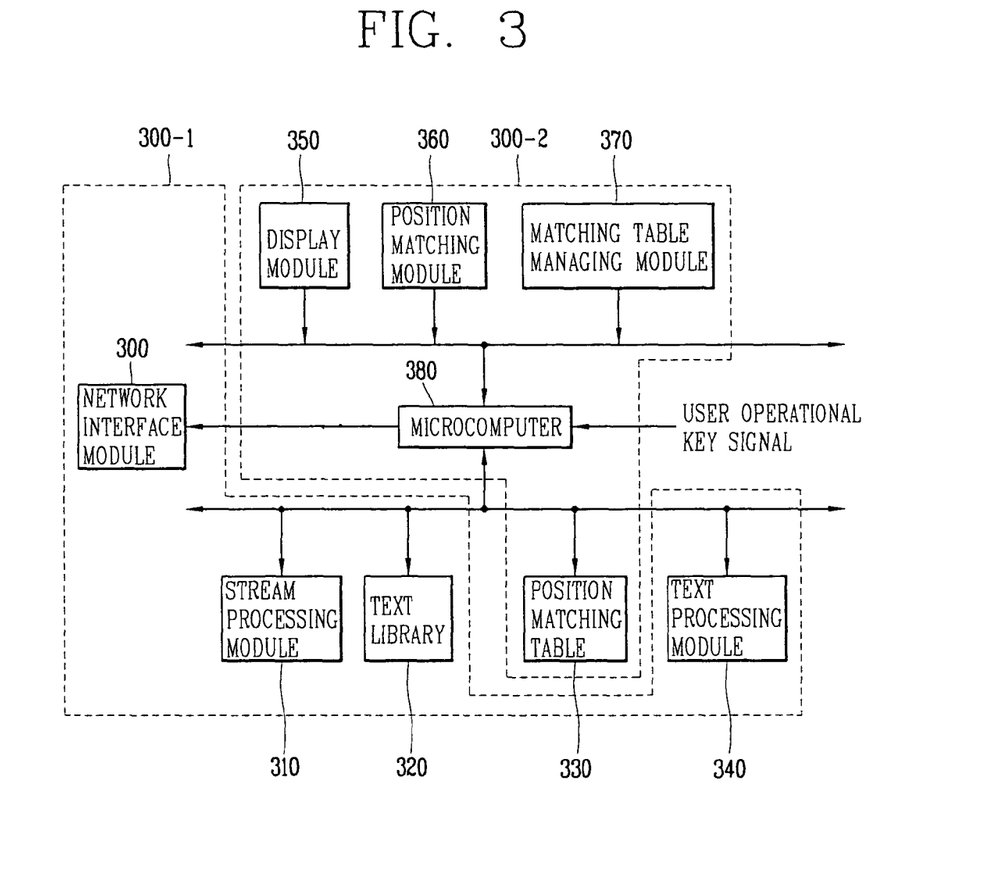
FIG. 3 is a block diagram illustrating an apparatus for distinguishing positions of home network appliances in accordance with the present invention.

FIG. 3 is a block diagram illustrating an apparatus for distinguishing positions of home network appliances in accordance with the present invention. In more detail, FIG. 3 shows the apparatus for distributing positions of different types and the same type of home network appliances. For example, the different types of home network appliances mean a computer, a refrigerator, an air conditioner, a washing machine, a digital television and a VTR, etc. The same type of home network appliances mean not less than two similar type apparatus. For example, when there are one air conditioner in a boudoir and one air conditioner in a living room, there are two similar type home network appliances in the home.

Figure 6:
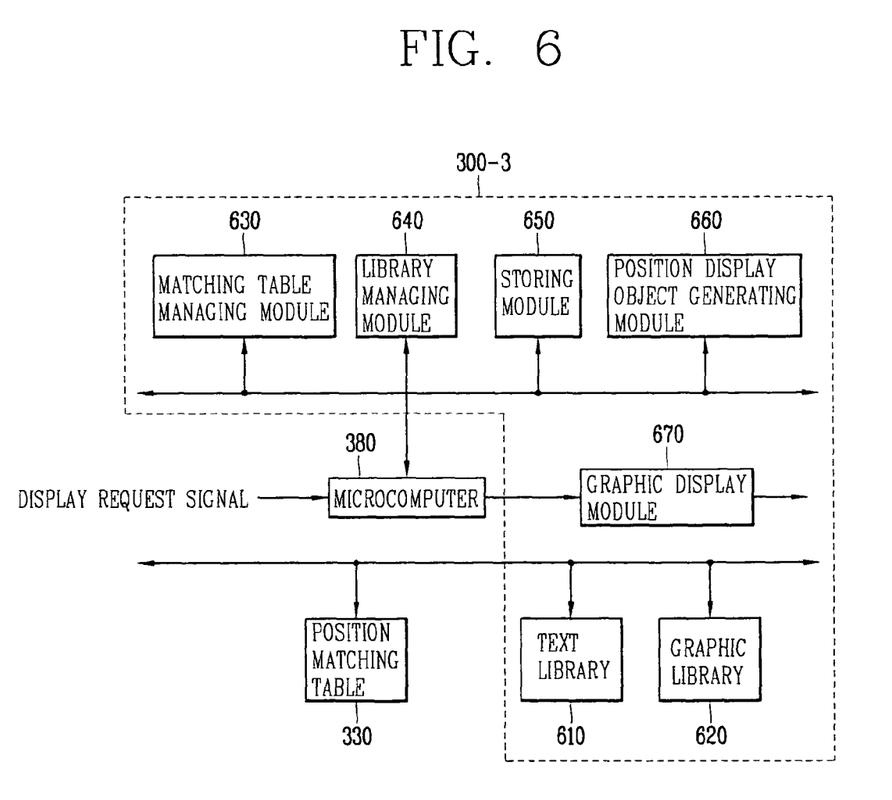
FIG. 6 is a block diagram illustrating an apparatus for displaying positions of home network appliances in accordance with the present invention.

As depicted in FIG. 3, the apparatus for distinguishing positions of the home network appliances includes an appliance identifier generating unit 300-1 for generating an appliance identifier by reading an appliance type identifier and an appliance inherent identifier from appliance characteristics data stream transmitted from the home network appliance and linking the appliance type identifier and the appliance inherent identifier; and a position matching unit 300-2 for setting a position pointer for indicating a position of the home network appliance and matching the set position pointer with the appliance identifier of the home network appliance corresponded to the position pointer. By generating a text object showing the position pointer matched with the appliance identifier, generating a graphic object showing the appliance identifier matched with the position pointer, generating a position display object by combining the text object with the graphic object and further including a display unit 300-3 for displaying the position display object on a screen of the apparatus for distinguishing positions of the home network appliances, a user can easily recognize a position of the home network appliance to be controlled. Herein, the appliance identifier generating unit 300-1 and the position matching unit 300-2 are shown in FIG. 3, and the display unit 300-3 is shown in FIG. 6. In addition, the position display object is generated by displaying a text for indicating a position of a home network appliance on a certain portion of an icon for indicating a home network appliance in FIG. 7.

Hereinafter, the appliance identifier generating unit 300-1 and the position matching unit 300-2 will be described with reference to accompanying FIG. 3.

First, the appliance identifier generator 300-1 includes a network interface module 300 for receiving appliance characteristics data streams from the home network appliances; a stream processing module 310 for reading an appliance type identifier and a product inherent identifier from the received appliance characteristics data stream and generating an appliance identifier by linking the read appliance type identifier with the product inherent identifier; a text library 320 for storing the appliance identifier generated in the stream processing module 310; and a text processing module 340 for adjusting a text size of the appliance identifier stored in the text library 320 according to a preset font file.

The position matching unit 300-2 includes a position matching table 330 set so as to record the appliance identifier according to a position pointer; an indicating module 350 for indicating the appliance identifier adjusted in the text processing module 340 and the position pointer set in the position matching table 330 on a screen (operation panel); a position matching module 360 for matching the appliance identifier indicated by the indicating module 350 to a pertinent position indicator according to a user operational key signal; and a matching table managing module 370 for distinguishing the home network appliances by recording the appliance identifier on the position matching table 330 by the position indicator according to the information matched in the position matching module 360. In addition, a microcomputer 380 controls each unit 300~370 by receiving a user operational key signal.

Herein, the position pointer can be preset or be set by a user, and it indicates a certain position in home such as a boudoir, a living room, a kitchen and a bed room, etc. For example, when there are a first air conditioner and a first television in a boudoir and there are a second air conditioner and a second television in a living room, if position pointers respectively indicate the boudoir and the living room, the user can easily set positions of the first air conditioner and the first television at the position indicator indicating the boudoir, and the user can easily set positions of the second air conditioner and the second television at the position indicator indicating the living room. Accordingly, by setting positions of the different types of home network appliances and the same type of home network appliances at position indicators, it is possible to distinguish positions of the different types and the same type of home network appliances easily.

Hereinafter, the operation of the appliance identifier generating unit 300-1 and the position matching unit 300-2 will be described. In more detail, the operation of the apparatus for distinguishing positions of the home network appliances will be described.

First, the network interface module receives an appliance characteristics data stream from at least one home network appliance connected through a home network cable such as an optical cable or a coaxial cable according to a control signal of the micro computer 380.

The appliance characteristics data stream is an advertisement data stream of the home network appliance in the network using an UPnP (universal plug and play) or a reply data stream transmitted by the home network control appliance. The data stream includes appliance characteristics information, herein, the appliance characteristics information has data indicating a model name, a serial number, a manufacturer name and a state variable. The appliance type identifier and the product inherent identifier are included in the appliance characteristics data stream. In particular, the appliance type identifier and the product inherent identifier in the network using the UPnP are recorded in a xml spec as a "Friendly Name" and an "Universal Domain Number".

Afterward, in the stream processing module 310, when the network interface module 300 receives the appliance characteristics data stream, by the control of the microcomputer 380, it reads the appliance type identifier and the product inherent identifier by parsing the received appliance characteristics data stream, generates the appliance identifier by linking the read appliance type identifier with the product inherent identifier and transmits the generated appliance identifier to the text library 320. Herein, the appliance identifier respectively indicates the different types of home network appliances and the same type of home network appliances. For example, when three air conditioners and two refrigerators are connected to the home network control appliance, five appliance identifiers are generated, and the five appliance identifiers are transmitted to the text library 320.

In addition, the stream processing module 310 generates the appliance identifier by linking the read appliance type identifier to the product inherent identifier with a null string and transmits the generated appliance identifier to the text library 320. Herein, the text library 320 stores the appliance identifier.

The text processing module 340 adjusts a text size of the appliance identifier stored in the text library 320 according to a preset font file by the control of the microcomputer 380 and transmits the adjusted appliance identifier to the indicating module 350.

In order to make the user directly select and match the position pointer and the appliance identifier, the indicating module 350 displays the appliance identifier adjusted by the text processing module 340 and the position pointer preset by the position matching table 330 on the screen. Herein, the position matching table 330 is a set database in order to make the appliance identifier be recorded according to the preset position pointer.

In the meantime, when the position matching module 360 receives the user operational key signal for matching the appliance identifier with the position pointer according to the user selection through the microcomputer 380, the position matching module 360 matches the appliance identifier indicated by the indicating module 350 to a pertinent position pointer according to the received user operational key signal.

The matching table managing module 370 records the appliance identifier in the position matching table 360 according to the position pointer in accordance with the information matched in the position matching module 360 by the control of the microcomputer 380. For example, when an A appliance identifier is corresponded to the air conditioner in the living room, the A appliance identifier is recorded in the position matching table 360 by being matched to the position pointer pointing the living room. In addition, when a B appliance identifier is corresponded to the air conditioner in the boudoir, the B appliance identifier is recorded in the position matching table 360 by being matched to the position pointer pointing the boudoir. In addition, when a C appliance identifier is corresponded to the television in the living room, the C appliance identifier is recorded in the position matching table 360 by being matched to the position pointer pointing the living room. Accordingly, in the present invention, by recording the appliance identifier in the position matching table 360 according to the position pointer, it is possible to distinguish positions of the different types and the same type of home network appliances.

Hereinafter, the stream processing module 310 will be described in detail with reference to accompanying FIG. 4.

Figure 4:
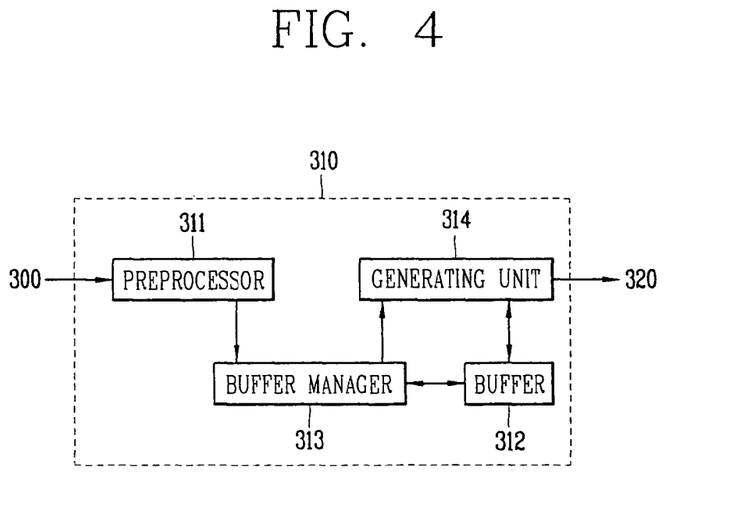
FIG. 4 is a block diagram illustrating a stream processing module of the apparatus in FIG. 3.

FIG. 4 shows the stream processing module 310 in detail.

As depicted in FIG. 4, the stream processing module 310 includes a preprocessor 311 for parsing the appliance characteristics data stream received from the network interface module 300; a buffer 312 for temporarily storing the appliance characteristics data stream parsed in the preprocessor 311; a buffer manager 313 for temporarily storing the appliance characteristics data stream parsed in the preprocessor 311 in the buffer 312 and outputting a register signal corresponded to the temporarily stored appliance characteristics data stream; and a generator 314 for reading the appliance type identifier and the product inherent identifier from the appliance characteristics data stream stored in the buffer 312 according to the register signal outputted from the buffer manager 313 and generating the appliance identifier by linking the read appliance type identifier to the product inherent identifier.

First, the preprocessor 311 parses the appliance characteristics data stream received from the network interface module 300 by appliance characteristics data units. Herein, the appliance characteristics data is transmitted from the home network appliance after being divided with a token (/), in the present invention, it is preferable to parse the appliance characteristics data stream by inserting a null string (O) after the token. For example, in the UPnP, it is preferable to parse the appliance characteristics data stream by methods such as a /0 appliance characteristics identifier (device type)/ and /0 appliance type identifier (friendly name)/.

The buffer manager 313 temporarily stores the appliance characteristics data parsed in the preprocessor 311 in the buffer 312 and outputs a register signal corresponded to the stored appliance characteristics data to the generator 314.

The generator 314 reads the appliance type identifier and the product inherent identifier by searching the appliance characteristics data stored in the buffer 312 according to the register signal outputted from the buffer manager 313, generates the appliance identifier by linking the read appliance type identifier to the product inherent identifier and stores the generated appliance identifier in the text library 320 according to the control of the microcomputer.

Figure 5:
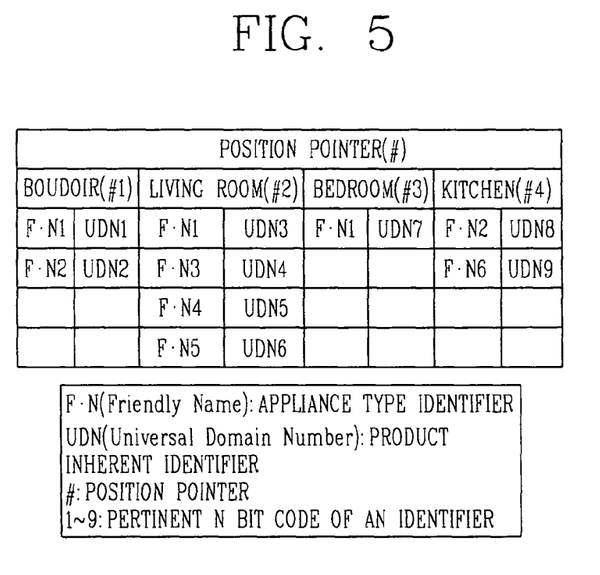
FIG. 5 is a position matching table of the apparatus in FIG. 3.

FIG. 5 shows the position matching table 330 in accordance with the present invention.

As depicted in FIG. 5, in the position matching table 330, a boudoir (#1), a living room (#2), a bedroom (#3) and a kitchen (#4) nodes are linked to a position pointer (#) as a top level node. In the boudoir node (#1), appliance identifiers of a F.N1 UDN1 and a F.N2 UDN2 are linked. Herein, the F.N (family name) indicates a type of a pertinent appliance (for example, a refrigerator, an air conditioner and a television, etc.), the UDN (universal domain number) indicates a serial number as a product inherent identifier, and it is known there are two types of home network appliances in the boudoir (#1) through the appliance identifier and the appliance type identifier. In addition, through the appliance identifier and the appliance type identifier, t is known one home network appliance of the same type (F.N1) is respectively located in the boudoir, the living room and the bedroom.

FIG. 6 is a block diagram illustrating an apparatus for displaying positions of home network appliances in accordance with the present invention. In more detail, FIG. 6 shows the display unit 300-3 for displaying positions of the home network appliances on the screen.

As depicted in FIG. 6, the display unit 300-3 includes a text library 610 for storing a text object corresponded to the position pointer recorded in the position matching table 330 and a graphic library 620 for storing a graphic object (for example, icon) corresponded to the appliance identifier; a matching table managing module 630 for reading the appliance identifier matched to the pertinent position pointer by searching the position matching table 330 according to a display request signal generated by the user; a library managing module 640 for searching-reading the graphic object of the appliance identifier read in the matching table managing module 630 and the text object matched to the appliance identifier respectively in the text library 610 and the graphic library 620; a storing module 650 for temporarily storing the text object and the graphic object read from the library managing module 640; a position indication object generating module 660 for generating a position indicating object by combining the text object with the graphic object stored in the storing module 650; a graphic display module 670 for displaying the position indication object generated in the position indication object generating module 660 on the screen through graphic-processing; and a microcomputer 380 for controlling the above-mentioned parts 610~670.

First, when the microcomputer 380 receives an appliance identifier display request signal, the matching table managing module 630 reads a appliance identifier matched to a pertinent position pointer by searching the position matching table 330 according to the display request signal by the control of the microcomputer 680. Herein, the matching table managing module 370 of the position matching unit 300-2 can perform the function of the matching table managing module 630, and the position matching table 330 is a table set so as to match-record a appliance identifier according to a present position pointer, namely, a tree-structured database.

When the matching table managing module 330 reads the appliance identifier, the library managing module 640 searches-reads a graphic object for indicating the appliance identifier detected in the matching table managing module 630 and a text object for indicating the position pointer matched to the appliance identifier respectively in the text library 610 and the graphic library 620. Herein, the text library 610 is a database for storing a pertinent text object of the position pointer recorded in the position matching table 600, and the text library 320 of the appliance identifier generator 300-1 can perform the function of the text library 610 of the display unit 300-3. The graphic library 620 is a database having a graphic tree structure for storing a pertinent graphic object of the appliance identifier.

In the meantime, the library managing module 640 temporarily stores the read text object and the graphic object in the storing module 650 and outputs a register signal corresponded to the stored object to the position indication object generating module 660 according to the control signal of the microcomputer 680.

The position indication object generating module 660 combines the text object and the graphic object stored in the storing module 650 and outputs the combined position indication object to the graphic display module 670. Herein, it is preferable to combine the text object and the graphic object with reference to a preset font file.

The graphic display module 670 display the position indication object outputted from the position indication object generating module 660 on the screen according to the control signal of the microcomputer 680. Herein, the indicating module 350 can perform the function of the graphic display module 670. In addition, when the home network control appliance is a DTV, the position indication object is displayed on the screen of the DTV by the graphic display module 670.

Figure 7:
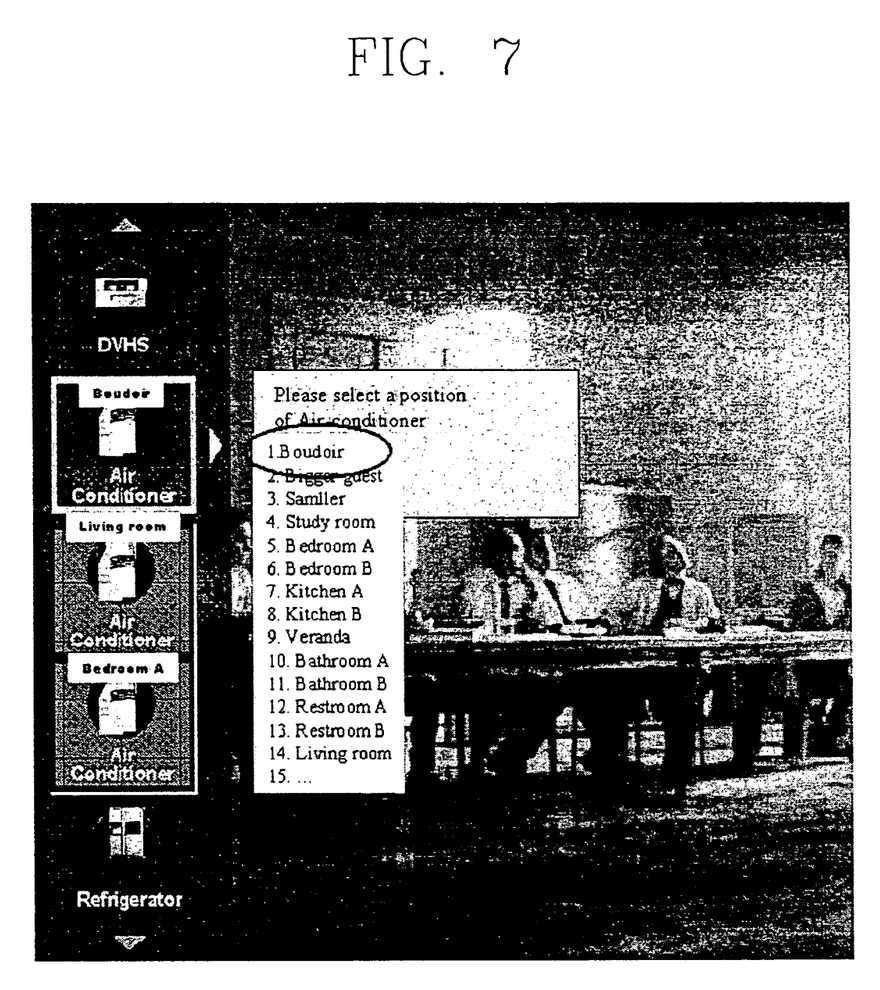
FIG. 7 shows a screen of a home network control appliance displaying combined graphic and text objects of the home network appliances pertinently.

FIG. 7 shows a screen of a home network control appliance displaying combined graphic and text objects of the home network appliances pertinently.

As depicted in FIG. 7, a pertinent graphic object of the home network appliance connected to the DTV as the home network control appliance, for example, pertinent graphic objects of the air conditioners are displayed on the screen by being distinguished according to positions, the user can easily recognize positions of the home network appliances to control.

As described above, in the apparatus and the method for displaying positions of the home network appliances in accordance with the present invention, by distinguishing positions of the different types and the same type of home network appliances, combining graphic objects of the distinguished home network appliances with text objects for indicating pertinent positions of the home network appliances and displaying the combined objects on the screen, the user can easily recognize positions of the home network appliances to control.

What is claimed is:

1. A method for displaying positions of home network appliances, comprising:
   generating via an appliance identifier generator, a graphic object corresponding to an appliance identifier, that has an appliance type identifier and an appliance inherent identifier, for indicating a home network appliance connected to a home network;
   generating a text object corresponding to a position pointer for indicating a position of the home network appliance; and
   displaying, via a display unit, the graphic object corresponding to the appliance identifier with the text object corresponding to the position pointer, wherein a text size of the appliance identifier is adjustable, wherein the appliance type identifier is a friendly name and the appliance inherent identifier is a Universal Domain Number (UDN), and wherein the friendly name and the UDN are linked together to identify different appliances, wherein the linked friendly name and the UDN are stored in a position matching table in which the position matching table includes rooms of the home including the home network appliances linked to the position pointer as a top level node and all of the different appliances identified by the linked friendly name and the UDN in lower level nodes for each room such that it can be known if one home appliance of the same linked friendly name and the UDN is located in multiple rooms.

2. An apparatus for displaying positions of home network appliances, comprising:

an appliance identifier generator configured to generate a graphic object corresponding to an appliance identifier, that has an appliance type identifier and an appliance inherent identifier, for indicating a home network appliance connected to a home network; and a display unit configured to generate a text object corresponding a position pointer for indicating a position of the home network appliance and display the graphic object corresponding to the appliance identifier with the text object corresponding the position pointer, wherein a text size of the appliance identifier is adjustable, wherein the appliance type identifier is a friendly name and the appliance inherent identifier is a Universal Domain Number (UDN), and wherein the friendly name and the UDN are linked together to identify different appliances, wherein the linked friendly name and the UDN are stored in a position matching table in which the position matching table includes rooms of the home including the home network appliances linked to the position pointer as a top level node and all of the different appliances identified by the linked friendly name and the UDN in lower level nodes for each room such that it can be known if one home appliance of the same linked friendly name and the UDN is located in multiple rooms.

3. A home network system comprising:

a network interface module configured to connect home network appliances to a home network;

a graphic display module configured to display information related to the home network appliances and the home network;

a position matching table configured to store information related to the home network appliances; and a processor configured to cooperate with the network interface module, the graphic display module, and the position matching table in order to display on a screen:

a first screen region to display icons representing the home network appliances, whereby a single icon represents a single type of home network appliance, a second screen region to display selectable scroll arrow icons to allow a user to scroll through multiple icons representing the home network appliances, and a third screen region to display a menu list for a particular type of home appliance, the menu list including location information indicating where one or more of the particular type of home appliance is located in the home network.

4. The system of claim 3, wherein the third screen region is a pop-up screen that is displayed upon user selection of a corresponding single icon that represents a single type of home network appliance.

5. The system of claim 4, wherein the menu list contains user selectable items for one or more home network appliances.

6. The system of claim 5, wherein the position matching table comprises entries for appliance type identifiers that indicate a type of home network appliance and product inherent identifiers that is unique to a particular home network appliance.

7. The method of claim 6, wherein the network interface module, the graphic display module, the position matching table, and the processor are implemented in a digital television apparatus.

* * * * *